Patented Aug. 5, 1952

2,606,166

UNITED STATES PATENT OFFICE 2,606,166

SOFTENING RUBBER

Tracy M. Patrick, Jr., Dayton, Ohio, assignor to Monsanto Chemical Company, St. Louis, Mo., a corporation of Delaware No Drawing. Application July 19, 1950, Serial No. 174,783

16 Claims. (Cl. 260—30.2)

This invention relates to softeners for rubbers and deals more particularly with methods of softening or plasticizing natural rubbers or synthetic rubbers such as the polymers and copolymers of 1,3-butadiene compounds.

In the manufacture of rubber goods, there is commonly added to the rubber, during processing, a material which softens, i. e., decreases the flow-resistance of the rubber and thereby facilitates processing operations such as milling, calendering, extruding, molding, etc. These operations are particularly difficult when working with synthetic rubbers, and numerous materials have been investigated as possible softeners for synthetic rubbers. Such prior materials have been generally of limited usefulness, in that the improvement of workability of the rubbers was often obtained only at the expense of adversely affecting the properties of the finished products, e. g., strength, odor, etc. Also, while a number of softeners were found to increase the plasticity of the rubbers during some of the processing steps, their plasticizing action was often destroyed in other processing steps so that the final extruded or molded rubbers were brittle and useless.

Now I have found that certain thiophene derivatives not only effect decreased flow-resistance of the rubber during processing, but also serve as plasticizers to yield a final product which has been permanently modified with respect to plasticity, flexibility, strength and other physical and mechanical properties.

The thiophene derivatives which I employ to obtain the improved rubbers comprise phenylhydrazones of an aldehyde containing a thiophene nucleus and selected from the class consisting of phenylhydrazones of 2-thiophenecarboxaldehyde, 3-thiophenecarboxaldehyde, 2-thianaphthenecarboxaldehyde and 3-thianaphthenecarboxaldehyde and derivatives of such aldehydes in which at least one nuclear hydrogen has been substituted by a member of the group consisting of chlorine, bromine and alkyl radicals of from 1 to 4 carbon atoms.

One class of thiophene derivatives which I have found to be particularly useful for the present purpose comprises the thiophenecarboxaldehydes and derivatives thereof having the general formula

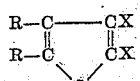

in which R is a member of the group consisting of hydrogen, chlorine, bromine and alkyl radicals of from 1 to 4 carbon atoms and X is a member of the class consisting of R and the radical

and in which one X must be R and the other X must be

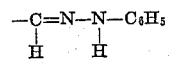

Compounds having the above general formula may be illustrated by the phenylhydrazones of 2-thiophenecarboxaldehyde, 5-chloro-2-thiophenecarboxaldehyde, 5 - methyl - 2 - thiophenecarboxaldehyde, 4,5-dimethyl - 2 - thiophenecarboxaldehyde, 5-ethyl-2-thiophenecarboxaldehyde, 5 - n-propyl-2-thiophenecarboxaldehyde, 3-thiophenecarboxaldehyde, 2-chloro-3-thiophenecarboxaldehyde, 2-bromo-3-thiophenecarboxaldehyde, etc.

Another class of compounds which may be employed as plasticizers to yield improved rubber compositions according to the present invention comprises the thianaphthene derivatives having the general formula

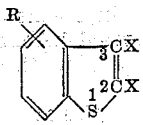

in which R is a member of the class consisting of hydrogen, chlorine, bromine and alkyl radicals of from 1 to 4 carbon atoms and X is a member of the class consisting of R and the radical

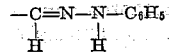

and in which one X must be R and the other X must be

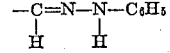

Compounds having this general formula include the phenylhydrazones of 2-thianaphthenecarboxaldehyde and 3-thianaphthenecarboxaldehyde and their chloro-, bromo-, and lower alkyl derivatives.

The compounds of this invention may be prepared by methods well-known to the art. Thus, the phenylhydrazones of 2-thiophenecarboxaldehyde may be readily prepared by treating thiophene with N-methylformanilide in the presence of phosphoryl chloride, steam-distilling the resulting complex to obtain 2-thiophenecarboxaldehyde and reacting the latter with phenylhydrazine.

The present thiophene derivatives, as is customary with rubber plasticizers, are preferably mixed into the rubber previous to or during the milling operation. However, they may be added at any stage of the rubber processing to yield finished products of improved physical characteristics. The amount of the present softeners or plasticizers employed depends upon the nature of the rubber with which it is to be used as well as the degree of softening desired, and generally ranges from, say, about 0.5 part to 5.0 parts or more per 100 parts of the rubber. The usual compounding ingredients, e. g., materials such as sulfur, zinc oxide, antioxidants, fillers, etc., are added at appropriate operating steps in customarily employed quantities.

The term "rubber" as herein employed refers generally to natural rubber and synthetic rubbers such as those obtained by polymerizing a 1,3-butadiene compound either alone or in admixture with other polymerizable compounds which are capable of copolymerizing with the 1,3-butadiene compounds. Examples of 1,3-butadiene compounds which yield synthetic rubbers by polymerization or copolymerization are 1,3-butadiene, chloroprene, piperylene, 2,3-dimethyl-1,3-butadiene, etc. As illustrative of compounds capable of copolymerizing with such 1,3-butadienes are compounds which contain a

group, for example aryl olefins, such as styrene, vinylbiphenyl and vinylnaphthalene; acrylic or methacrylic acids and their derivatives such as acrylonitrile, methyl methacrylate, and methacrylamide; alkyl vinyl ethers such as methyl vinyl ether; alkyl vinyl ketones such as isopropenyl methyl ketone; aliphatic olefins such as isobutylene, etc.

The following examples are illustrative, but not restrictive, of the invention:

Example 1

The softening effect of 2-thiophenecarboxaldehyde phenylhydrazone on low temperature GR-S rubber (a commercially available butadiene-styrene copolymer) was evaluated by employing the following procedure:

The rubber was banded to a 6 inch x 12 inch laboratory rubber mill having its rolls heated to approximately 100° C. Mixing was initiated and the softener, in the amounts indicated below, was added after a time of 30 seconds. The mixing was continued for an additional 6 minutes. A portion of the mixed batch was then cut off and sheeted for test specimens preparation. Specimens were heated for 10 minutes at a temperature of 163° C. and viscosities and plasticities were determined on both the unheated and heated samples. The technique employed for the Mooney viscosity tests was that described in the American Society for Testing Materials, Specification D927-47T. The plasticity determinations were made by the Williams (Parallel Plate) technique (American Society for Testing Materials, Specification D926-47T) and the Firestone technique (noting the time required to extrude 5 cc. of the specimen at 10 p. s. i. at 82° C.).

The following results were obtained:

| Percent Softener Based on Weight of Rubber | Mooney Viscosity | | Firestone Plasticity | | Williams Plasticity | |
|---|---|---|---|---|---|---|
| | Unheated | Heated | Unheated | Heated | Unheated | Heated |
| 3.0 | 32 | 32 | 19 | 11 | 147 | 133 |
| 2.0 | 45 | 43 | 20 | 11 | 180 | 153 |
| 1.0 | 47 | 44 | 20 | 14 | 195 | 203 |
| 0.0 | 50 | 50 | 31 | 25 | 257 | 266 |

Example 2

The softened rubber stock of Example 1 was compounded as follows:

| | Parts by weight |
|---|---|
| Low temperature GR-S rubber softened with 2-thiophenecarboxaldehyde phenylhydrazone | 100.0 |
| Philblack O (a commercially available carbon black) | 50.0 |
| Zinc oxide | 5.0 |
| Paraflux (an asphaltic flux) | 8.0 |
| Santocure (N - cyclohexyl - 2-benzothiazyl sulfenamide accelerator) | 1.2 |

Homogeneous compositions were formed which gave smooth sheets from mill rolls. Vibration properties of the cured, compounded stock were tested and compared with similarly compounded stocks containing other plasticizers by means of a Goodrich Flexometer at 175 p. s. i., 0.175 inch and 30 strokes per second. The following results were obtained:

| Plasticizer in Softened GR-S Stock | Min. Cure at 142° C. | Initial Static Compression | Change in Height During Flexure, Percent | Permanent Set, Percent | Temp. Rise, °C. |
|---|---|---|---|---|---|
| 3% of 2-thiophenecarboxaldehyde phenylhydrazone | 45 | 29.0 | 7.5 | 14.2 | 73 |
| 3% of 2-thiophenecarboxaldehyde phenylhydrazone | 60 | 28.0 | 7.0 | 11.8 | 68 |
| 2% of 2-thiophenecarboxaldehyde phenylhydrazone | 45 | 28.4 | 9.0 | 14.8 | 75 |
| 2% of 2-thiophenecarboxaldehyde phenylhydrazone | 60 | 28.1 | 6.5 | 11.6 | 70 |
| 1% of 2-thiophenecarboxaldehyde phenylhydrazone | 45 | 27.3 | 9.6 | 15.7 | 73 |
| 1% of 2-thiophenecarboxaldehyde phenylhydrazone | 60 | 25.8 | 5.2 | 12.2 | 70 |
| 1% of plasticizer A[1] | 45 | 25.7 | 10.0 | 16.5 | 78 |
| 1% of plasticizer A[1] | 60 | 24.7 | 6.7 | 13.0 | 72 |
| 1% of plasticizer B[1] | 45 | 27.6 | 14.8 | 19.5 | 90 |
| 1% of plasticizer B[1] | 60 | 27.3 | 10.8 | 15.4 | 80 |

[1] Commercially available rubber plasticizers.

The vibration properties of compounded, low-temperature GR-S stocks containing 2-thiophenecarboxaldehyde phenylhydrazone, as shown in the above table, are superior to those obtained when using the known rubber plasticizers.

The invention is not limited to the specific embodiments herein disclosed. The preferred phenylhydrazones may be employed in different proportions than specifically shown and in conjunction with other compounding and vulcan-

What I claim is:

1. A composition of matter comprising a rubber selected from the group consisting of natural rubber, polymeric 1,3-butadiene compounds and copolymers of 1,3-butadiene compounds with a compound which contains a

group and is copolymerizable with the 1,3-butadiene compound, and, as a softener therefor, a phenylhydrazone of an aldehyde selected from the class consisting of 2-thiophenecarboxaldehyde, 3-thiophenecarboxaldehyde, 3-thianaphthenecarboxaldehyde, 2 - thianaphthenecarboxaldehyde and derivatives of the same in which at least one nuclear hydrogen has been replaced by a member of the group consisting of chlorine, bromine and alkyl radicals of from 1 to 4 carbon atoms.

2. A composition of matter comprising a synthetic rubber copolymer of 1,3-butadiene and styrene, and, as a softener therefor, a phenylhydrazone of an aldehyde selected from the class consisting of 2-thiophenecarboxaldehyde, 3-thiophenecarboxaldehyde, 3 - thianaphthenecarboxaldehyde, 2 - thianaphthenecarboxaldehyde and derivatives of the same in which at least one nuclear hydrogen has been replaced by a member of the group consisting of chlorine, bromine and alkyl radicals of from 1 to 4 carbon atoms.

3. A composition of matter comprising a rubber selected from the class consisting of natural rubber, polymeric 1,3-butadiene compounds and copolymers of 1,3-butadiene compounds with a compound which contains a

group and is copolymerizable with the 1,3-butadiene compound, and, as a softener therefor, a thiophene derivative having the general formula

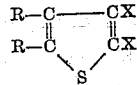

in which R is a member of the group consisting of hydrogen, chlorine, bromine and alkyl radicals of from 1 to 4 carbon atoms and X is a member of the class consisting of R and the radical

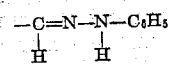

and in which one X must be R and the other X must be

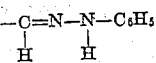

4. A composition of matter comprising a rubber selected from the group consisting of natural rubber, polymeric 1,3-butadiene compounds and copolymers of 1,3-butadiene compounds with a compound containing a

group and copolymerizing with the 1,3-butadiene compound, and, as a softener therefor, a thianaphthene derivative having the general formula

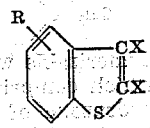

in which R is a member of the class consisting of hydrogen, chlorine, bromine and alkyl radicals of from 1 to 4 carbon atoms and X is a member of the class consisting of R and the radical

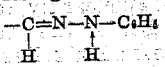

and in which one X must be R and the other X must be

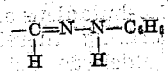

5. A composition of matter comprising a synthetic rubber copolymer of 1,3-butadiene and styrene, and, as a softener therefor, a thiophene derivative having the general formula

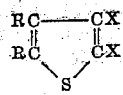

in which R is a member of the group consisting of hydrogen, chlorine, bromine and alkyl radicals of from 1 to 4 carbon atoms and X is a member of the class consisting of R and the radical

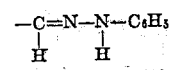

and in which one X must be R and the other X must be

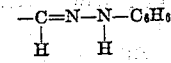

6. A composition of matter comprising a synthetic rubber copolymer of 1,3-butadiene and styrene and, as a softener therefor, a thianaphthene derivative having the general formula

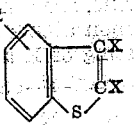

in which R is a member of the class consisting of hydrogen, chlorine, bromine and alkyl radicals of from 1 to 4 carbon atoms and X is a member of the class consisting of R and the radical

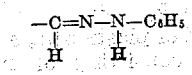

and in which one X must be R and the other X must be

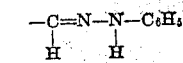

7. A composition of matter comprising a synthetic rubber copolymer of 1,3-butadiene and styrene and the phenylhydrazone of 2-thiophenecarboxaldehyde as a softener therefor.

8. A composition of matter comprising a synthetic rubber copolymer of 1,3-butadiene and styrene and the phenylhydrazone of 2-thiophenecarboxaldehyde, the phenylhydrazone being present in a quantity of from 0.5 part to 5.0 parts per 100 parts by weight of said copolymer.

9. The method of plasticizing a rubber selected from the group consisting of natural rubber, polymeric 1,3-butadiene compounds and copolymers of 1,3-butadiene compounds with a compound, which contains a

group and is copolymerizable with the 1,3-butadiene compound which comprises incorporating therein a phenylhydrazone of an aldehyde selected from the class consisting of 2-thiophenecarboxaldehyde, 3-thiophenecarboxaldehye, 3-thianaphthenecarboxaldehyde, 2-thianaphthenecarboxaldehyde and derivatives of the same in which at least one nuclear hydrogen has been replaced by a member of the group consisting of chlorine, bromine and alkyl radicals of from 1 to 4 carbon atoms.

10. The method of plasticizing a synthetic rubber copolymer of 1,3-butadiene and styrene which comprises incorporating therein a phenylhydrazone of an aldehyde selected from the class consisting of 2 - thiophenecarboxaldehyde, 3 - thiophenecarboxaldehyde, 2 - thianaphthenecarboxaldehyde, and 3-thianaphthenecarboxaldehyde and derivatives of the same in which at least one nuclear hydrogen has been replaced by a member of the group consisting of chlorine, bromine and alkyl radicals of from 1 to 4 carbon atoms.

11. The method of plasticizing a rubber selected from the class consisting of natural rubber, polymeric 1,3-butadiene compounds and copolymers of 1,3-butadiene compounds with a compound which contains a

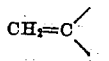

group and is copolymerizable with the 1,3-butadiene compound which comprises incorporating therein a thiophene derivative having the general formula

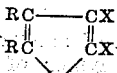

in which R is a member of the group consisting of hydrogen, chlorine, bromine and alkyl radicals of from 1 to 4 carbon atoms and X is a member of the class consisting of R and the radical

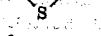

and in which one X must be R and the other X must be

12. The method of plasticizing a rubber selected from the class consisting of natural rubber, polymeric 1,3-butadiene compounds and copolymers of 1,3-butadiene compounds with a compound which contains a

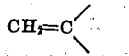

group and is copolymerizable with the 1,3-butadiene compounds which comprises incorporating therein a thianaphthene derivative having the general formula

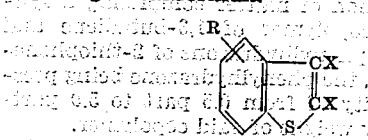

in which R is a member of the group consisting of hydrogen, chlorine, bromine and alkyl radicals of from 1 to 4 carbon atoms and X is a member of the class consisting of R and the radical

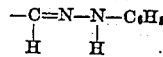

and in which only one X must be R and the other X must be

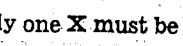

13. The method of plasticizing a synthetic rubber copolymer of 1,3-butadiene and styrene which comprises incorporating therein a thiophene derivative having the general formula

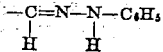

in which R is a member of the group consisting of hydrogen, chlorine, bromine and alkyl radicals of from 1 to 4 carbon atoms and X is a member of the class consisting of R and the radical

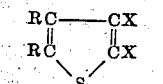

and in which one X must be R and the other X must be

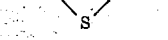

14. The method of plasticizing a synthetic rubber copolymer of 1,3-butadiene and styrene which comprises incorporating therein a thianaphethene derivative having the general formula

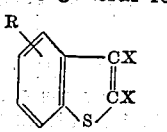

in which R is a member of the group consisting of hydrogen, chlorine, bromine and alkyl radicals of from 1 to 4 carbon atoms and X is a member of the class consisting of R and the radical

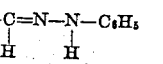

and in which one X must be R and the other X must be

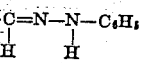

15. The method of plasticizing a synthetic rubber copolymer of 1,3-butadiene and styrene which comprises incorporating therein the phenylhydrazone of 2-thiophenecarboxaldehyde.

16. The method of plasticizing a synthetic rubber copolymer of 1,3-butadiene and styrene which comprises incorporating therein the phenylhydrazone of 2 - thiophenecarboxaldehyde, the quantity of the phenylhydrazone being from 0.5 part to 5.0 parts per 100 parts by weight of said copolymer.

TRACY M. PATRICK, Jr.

REFERENCES CITED

The following references are of record in the file of this patent:

UNITED STATES PATENTS

| Number | Name | Date |
|---|---|---|
| 2,230,894 | Gumlich | Feb. 4, 1941 |

OTHER REFERENCES

"Organic Chemistry" by P. Karrer (2d ed.), published 1946, pp. 737, 738 and 743.